United States Patent
Xing et al.

(10) Patent No.: US 9,887,421 B2
(45) Date of Patent: Feb. 6, 2018

(54) LI$_w$NI$_x$MN$_y$O$_z$ SPINELS AND METHOD OF MAKING AND USING THE SAME

(71) Applicant: ADA TECHNOLOGIES, INC., Littleton, CO (US)

(72) Inventors: Weibing Xing, Littleton, CO (US); Josh Buettner-Garrett, Littleton, CO (US); Michael Krysiak, Conifer, CO (US); Joseph Kelly, Arvada, CO (US); Jian Zhang, Englewood, CO (US)

(73) Assignee: ADA TECHNOLOGIES INC., Littleton, CO (US)

( * ) Notice: Subject to any disclaimer, the term of this patent is extended or adjusted under 35 U.S.C. 154(b) by 0 days.

(21) Appl. No.: 14/606,932

(22) Filed: Jan. 27, 2015

(65) Prior Publication Data

US 2015/0357642 A1 Dec. 10, 2015

Related U.S. Application Data

(60) Provisional application No. 61/932,124, filed on Jan. 27, 2014.

(51) Int. Cl.
| | |
|---|---|
| *H01M 4/505* | (2010.01) |
| *H01M 4/525* | (2010.01) |
| *H01M 4/36* | (2006.01) |
| *C01G 53/00* | (2006.01) |
| *H01M 4/02* | (2006.01) |

(52) U.S. Cl.
CPC ......... *H01M 4/505* (2013.01); *C01G 53/52* (2013.01); *C01G 53/44* (2013.01); *C01P 2002/32* (2013.01); *C01P 2002/72* (2013.01); *C01P 2004/03* (2013.01); *C01P 2004/41* (2013.01); *C01P 2004/61* (2013.01); *C01P 2004/64* (2013.01); *C01P 2006/40* (2013.01); *H01M 4/364* (2013.01); *H01M 4/525* (2013.01); *H01M 2004/028* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 5,631,104 | A | 5/1997 | Zhong et al. |
| 7,026,070 | B2 | 4/2006 | Noguchi et al. |
| 7,674,557 | B2 | 3/2010 | Sun et al. |
| 8,133,462 | B2 | 3/2012 | Jouanneau et al. |
| 8,137,844 | B2 | 3/2012 | Awano et al. |

OTHER PUBLICATIONS

Wei et al. Effects of Ni Doping on [MnO6] Octahedron in LiMn2O4. J. Phys. Chem B 2004, 108, 18547-18551.*

Kunduraci et al. Synthesis and Characterization of Nanostructured 4.7V LixMn1.5Ni0.5O4 Spinels for High Power Lithium-Ion Batteries. Journal of the Electrochemical Society, 153 (7) A1345-A1352 (2006).*

Kunduraci et al. High-Power Nanostructured LiMn2-xNixO4 High-Voltage Lithium-Ion Battery Electrode Materials: Electrochemical Impact of Electronic Conductivity and Morphology. Chem Mater. 2006, 18, 3585-3592.*

YongLi et al. Electrochemical Performance Ni Doped Spinel LiMn2O4 Cathode for Lithium Ion Batteries. Advanced Materials Research, 347-353, 290-300.*

Hao et al. Two-step hydrothermal synthesis of submicron Li1+xNi0.5Mn1.5O4=y for lithium ion battery cathodes (x=0.02, y=0.12). Dalton Trans, 2012, 41, 8067.*

Hu et al. Oxygen Release Related Thermal Stability and Decomposition Pathways of LixNi0.5Mn1.5O4 Cathode Materials. Chem. Mater. 2014, 26, 1108-1118.*

Chemelewski et al. Factors Influencing the Electrochemical Properties of High Voltage Spinel Cathodes: Relative Impact of Morphology and Cation Ordering. Chem Mater. 2013, 25, 2890-2897.*

Zhou et al. LiNi0.5Mn1.5O4 Hollow Structures as High-Performance Cathodes for Lithium-Ion Batteries. Angew Chem Int Ed, 2012, 51, 239-241.*

Maeda et al. Effect of deviation from Ni/Mn stoichiometry in Li[Ni1/2Mn3/2]O4 upon rechargeable capacity at 4.7V in nonaqueous lithium cells. Journal of the Ceramic Society of Japan 117 [11] 1216-1220, 2009 (Year: 2009).*

Arrebola et al. "PMMA-assisted synthesis of Li1-xNi0.5Mn1.5O4-d for high-voltage lithium batteries with expanded rate capability at high cycling temperatures", Journal of Power Sources, Jun. 2008, vol. 180(2), pp. 852-858, 1 page, abstract only.

Xiao et al, "High-Performance LiNi0.5Mn1.5O4 Spinel Controlled by Mn3+ Concentration and Site Disorder", Advanced Materials, 2012, vol. 24(16), pp. 2109-2116, 2 pages, abstract only.

Xing, et al., "High Performance LiNi0.5Mn1.5O4 Spinel Li-ion Battery Cathode Development", Electrochemical Society Transactions, 2013, 53(30), pp. 111-119, 9 pages.

* cited by examiner

*Primary Examiner* — Tanisha Diggs
(74) *Attorney, Agent, or Firm* — Sheridan Ross P.C.

(57) ABSTRACT

A process is provided for synthesizing a lithium, nickel, manganese and oxygen composition, $Li_wNi_xMn_yO_z$, where w is from about 0.8 to about 1.2, x is from about 0.3 to about 0.8, y is from about 1.3 to about 1.8, and z is from about 3.8 to about 4.2. The composition has a lattice parameter "a" value and wt % crystalline spinel value within the bounds defined by the following lattice parameter "a" and wt % crystalline spinel coordinate values of about (8.1690 Å, 98.5%), about (8.1765 Å, 98.5%), about (8.1810 Å, 96.2%), about (8.1810 Å, 93.4%), about (8.1771 Å, 93.4%), and about (8.1690 Å, 97.6%).

14 Claims, 9 Drawing Sheets

$Li_wNi_xMn_yO_z$ SPINELS AND METHOD OF MAKING AND USING THE SAME

CROSS REFERENCE

The present application claims the benefits of U.S. Provisional Application Ser. No. 61/932,124, filed Jan. 27, 2014, entitled "Method of Making $LiNi_{0.5}Mn_{1.5}O_4$ Spinel as High Temperature Stable Cathode for Lithium Ion Batteries", which is incorporated herein by this reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. FA9453-11-C-0161 awarded by the Air Force.

FIELD

The disclosure relates generally to $Li_wNi_xMn_yO_z$ compositions and methods of making the same and particularly to $Li_wNi_xMn_yO_z$ spinel compositions and methods of making the same.

BACKGROUND

New lithium-containing electrode materials with increased performance, safe operation, and long storage and cycle life are needed for electrical devices. For example, new lithum-containing electrode materials are needed in the area of advanced transportation devices (such as, electric vehicles, hybrid electric vehicles, and plug-in vehicles) and consumer electronics (such as, notebook computers, cellular telephones, pagers, video cameras, tablet computers, and other hand-held tools and devices to name a few). Furthermore, new lithium-containing electrode materials are needed for medical electronics (such as, portable defibrillators, drug delivery units, and neurological stimulators to name a few) and in mobile power applications (such as unmanned aerial vehicles, spacecraft probes and missile systems to name a few).

SUMMARY

The various aspects, embodiments, and configurations of the present disclosure addresses these and other needs. The present disclosure is directed to a method of synthesizing spinel materials comprising lithium, nickel, manganese and oxygen.

In accordance with some embodiments is a method having the steps of: providing a precursor mixture having a molar ratio of lithium to nickel to manganese of about 2 to about 1 to about 3; charging a ball mill with the precursor mixture; milling the precursor mixture to form a milled precursor; adding a chelating agent to the milled precursor to form a chelated mixture and thereafter milling with at least one reversal of the milling direction the chelated mixture to form a milled chelated mixture; and adding a polymeric, aqueous medium to the milled chelated mixture to form a polymeric mixture and, thereafter milling with more than two reversals of the milling direction the polymeric mixture to form a milled polymeric mixture. In some embodiments of the method, the milling with at least one reversal includes a pause of no more than 1 second between each of the least one reversal of directions. In some embodiments of the method, the milling with more than two reversals of the milling direction includes a pause of more than 1 second between each of the more than two reversal of directions. Moreover, some embodiments include the milling with more than two reversals of the milling direction further includes two or more sub-milling steps. Furthermore, in some embodiments each of the two or more sub-milling include a reversal of the sub-step milling direction. The reversal of the sub-step milling direction includes, in some embodiments, a pause of less than 1 second. In some embodiments, the milling with more than two reversals of the milling direction further includes four sub-milling steps. The method further includes in some embodiments, heat treating the milled polymeric mixture, wherein the heat treating comprises a multi-stage heating process.

In accordance with some embodiments is a composition having lithium, nickel, manganese and oxygen. In some embodiments, the composition is represented by the chemical formula of $Li_wNi_xMn_yO_z$, where w is from about 0.8 to about 1.2, where x is from about 0.3 to about 0.8, where y is from about 1.3 to about 1.8, and where z is from about 3.8 to about 4.2. The composition has, in some embodiments, a lattice parameter "a" value and wt % crystalline spinel value within the bounds defined by the following lattice parameter "a" and wt % crystalline spinel coordinate values of about (8.1690 Å, 98.5%), about (8.1765 Å, 98.5%), about (8.1810 Å, 96.2%), about (8.1810 Å, 93.4%), about (8.1771 Å, 93.4%), and about (8.1690 Å, 97.6%). In some embodiments, the composition further includes a nickel/manganese oxide. Furthermore, in some embodiments, the composition contains from about 0.1 to about 10 wt % of the nickel/manganese oxide. In some embodiments, the composition contains from about 1 to about 3 wt % of the lithium/nickel oxide. Moreover, in some embodiments, the composition further includes a lithium/nickel oxide. Moreover, in some embodiments, the composition includes from about 5 to about 7 wt % of the lithium/nickel oxide. In some embodiments, the composition has an average particle size from about 10 nm to about 3 µm. In some embodiments, the composition comprises particles resembling an octahedral. In some embodiments, the composition has a % 4V plateau from about 10 to about 27%.

In accordance with some embodiments is a composition having lithium, nickel, manganese and oxygen. In some embodiments, the composition is represented by the chemical formula of $Li_wNi_xMn_yO_z$, where w is from about 0.8 to about 1.2, where x is from about 0.3 to about 0.8, where y is from about 1.3 to about 1.8, and where z is from about 3.8 to about 4.2. The composition has, in some embodiments, a % 4V plateau and wt % crystalline spinel values within the bounds defined by the following % 4V plateau value, wt % crystalline spinel coordinate values of about (10%, 98.5%), about (19.9%, 98.5%), about (27%, 96.14%), about (27%, 93.4%), about (20.8%, 93.4%), and about (10%, 97%). In some embodiments, the composition further includes a nickel/manganese oxide, wherein the composition comprises from about 0.1 to about 10 wt % of the nickel/manganese oxide. In some embodiments, the composition comprises from about 1 to about 3 wt % of the lithium/nickel oxide. Moreover the composition further includes, in some embodiments, a lithium/nickel oxide. In some embodiments, the composition has from about 5 to about 7 wt % of the lithium/nickel oxide. In some embodiments, the composition is in the form of particles, the particles resemble an octahedral. In some embodiments, the particles have an average particle size from about 10 nm to about 3 μm. In some embodiments, the composition has a lattice parameter "a" value from about 8.1690 to about 8.1810 Å.

In accordance with some embodiments is a composition having lithium, nickel, manganese and oxygen. In some embodiments, the composition is represented by the chemical formula of $Li_wNi_xMn_yO_z$, where w is from about 0.8 to about 1.2, where x is from about 0.3 to about 0.8, where y is from about 1.3 to about 1.8, and where z is from about 3.8 to about 4.2. The composition has, in some embodiments, a lattice parameter "a" value and wt % crystalline spinel value within the bounds defined by the following lattice parameter "a" and wt % crystalline spinel coordinate values of about (8.1690 Å, 98.5%), about (8.1765 Å, 98.5%), about (8.1810 Å, 96.2%), about (8.1810 Å, 93.4%), about (8.1771 Å, 93.4%), and about (8.1690 Å, 97.6%) and a % 4V plateau from about 10 to about 27%. In some embodiments, the composition further includes a nickel/manganese oxide. Furthermore, in some embodiments, the composition contains from about 0.1 to about 10 wt % of the nickel/manganese oxide. In some embodiments, the composition contains from about 1 to about 3 wt % of the lithium/nickel oxide. Moreover, in some embodiments, the composition further includes a lithium/nickel oxide. Moreover, in some embodiments, the composition includes from about 5 to about 7 wt % of the lithium/nickel oxide. In some embodiments, the composition has an average particle size from about 10 nm to about 3 μm. In some embodiments, the composition comprises particles resembling an octahedral.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to only the illustrated and described examples.

Further features and advantages will become apparent from the following, more detailed, description of the various embodiments of the invention(s), as illustrated by the drawings referenced below.

DETAILED DESCRIPTION

In accordance with some embodiments is a novel $Li_wNi_xMn_yO_z$ composition. Lithium ion batteries typically comprise $LiNi_{0.5}Mn_{1.5}O_4$ having a spinel structure.

The novel $Li_wNi_xMn_yO_z$ composition can have a value of w from about 0.8 to about 1.2, a value of x from about 0.3 to about 0.8, a value of y from about 1.3 to about 1.8, and a value of z from about 3.8 to about 4.2.

It can be appreciated that some phases of the novel $Li_wNi_xMn_yO_z$ composition can comprise $LiNi_{0.5}Mn_{1.5}O_4$, while other phases of the novel $Li_wNi_xMn_yO_z$ composition comprise combinations of one or more of lithium, nickel, manganese and oxygen other than the combination represented by the chemical formula $LiNi_{0.5}Mn_{1.5}O_4$.

Moreover, the novel $Li_wNi_xMn_yO_z$ composition can be one or more of substantially devoid of $LiNi_{0.5}Mn_{1.5}O_4$.

The novel $Li_wNi_xMn_yO_z$ composition can comprise one or both of lithium and manganese levels less than the standard LNMO (that is, $LiNi_{0.5}Mn_{1.5}O_4$). Moreover, in some embodiments, the novel $Li_wNi_xMn_yO_z$ composition comprises one or both of nickel and oxygen levels more than the standard LNMO (that is $LiNi_{0.5}Mn_{1.5}O_4$).

The novel $Li_wNi_xMn_yO_z$ composition can generally have a level of less than one mole of lithium per mole of the novel $Li_wNi_xMn_yO_z$ composition. That is, in the novel $Li_wNi_xMn_yO_z$ composition w can be typically less than one. Commonly, w can be from about 0.9998 to about 0.75, more commonly from about 0.998 to about 0.8, even more commonly from about 0.95 to about 0.97, or even more commonly from about 0.99 to about 0.94.

The novel $Li_wNi_xMn_yO_z$ composition can generally have a level of more than one 0.5 moles of nickel per mole of the novel $Li_wNi_xMn_yO_z$ composition. That is, in the novel $Li_wNi_xMn_yO_z$ composition x can be typically more than 0.5. Commonly, x can be from about 0.5001 to about 1.1, more commonly from about 0.509 to about 0.95, even more commonly from about 0.51 to about 0.9, or even more commonly from about 0.55 to about 0.82.

The novel $Li_wNi_xMn_yO_z$ composition can generally have a level of less than 1.5 moles of manganese per mole of the novel $Li_wNi_xMn_yO_z$ composition. That is, in the novel $Li_wNi_xMn_yO_z$ composition y can be typically less than 1.5. Commonly, y can be from about 1.4999 to about 1.300, more commonly from about 1.498 to about 1.45, even more commonly from about 1.497 to about 1.46, or even more commonly from about 1.495 to about 1.47.

The novel $Li_wNi_xMn_yO_z$ composition oxygen can generally have a level of more than four moles of oxygen per mole of the novel $Li_wNi_xMn_yO_z$ composition. That is, in the novel $Li_wNi_xMn_yO_z$ composition z can be typically more than 4. Commonly, z can be from about 4.001 to about 4.9, more commonly from about 4.05 to about 4.75, even more commonly from about 4.01 to about 4.4, or even more commonly from about 4.04 to about 4.22.

The novel $Li_wNi_xMn_yO_z$ composition can have a value of w from about 0.8 to about 1.2, a value of x from about 0.3 to about 0.8, a value of y from about 1.3 to about 1.8, and a value of z of more than about 4.

The novel $Li_wNi_xMn_yO_z$ composition can comprise a $Li_rNi_sMn_tO_u$ phase having a value of r from about 1.01 to about 1.2, a value of s from about 0.4 to about 0.6, a value of t from about 1.4 to about 1.6, and a value of u from about 4.01 to about 4.6. Typically, the value of s can be about 0.5. Commonly, the value of t can be 1.5.

In some embodiments, an active cathode material can comprise the novel $Li_wNi_xMn_yO_z$ composition.

While not wanting to be limited by example, a lithium ion battery can comprise the novel $Li_wNi_xMn_yO_z$ composition. Lithium ion batteries having the novel $Li_wNi_xMn_yO_z$ composition as the active cathode material can have one or more of high specific capacity, high specific energy, high power density, long cycle life, high rate capability, and high-temperature stability.

Figure 1A:
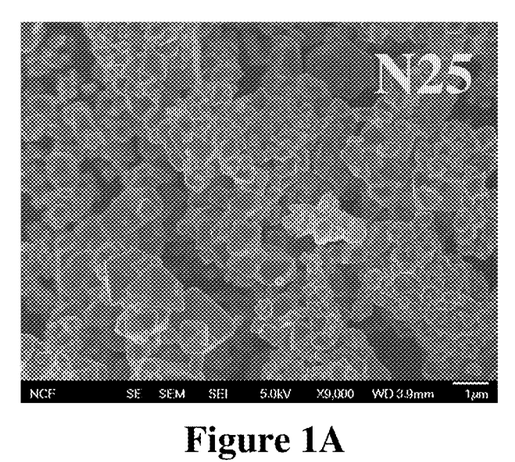
FIGS. 1A-1C are scanning electron microscopy images of novel $Li_wNi_xMn_yO_z$ compositions according to embodiments of the present disclosure.
Figure 1B:
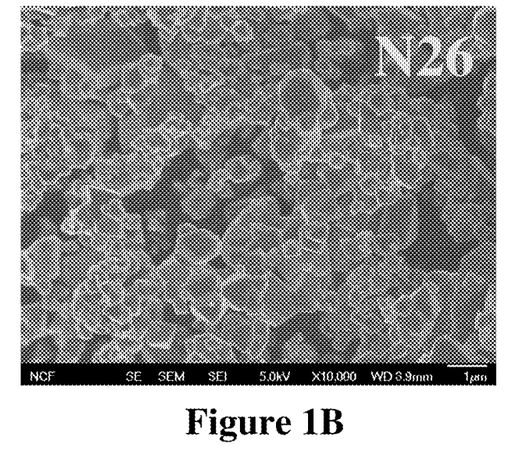
Figure 1C:
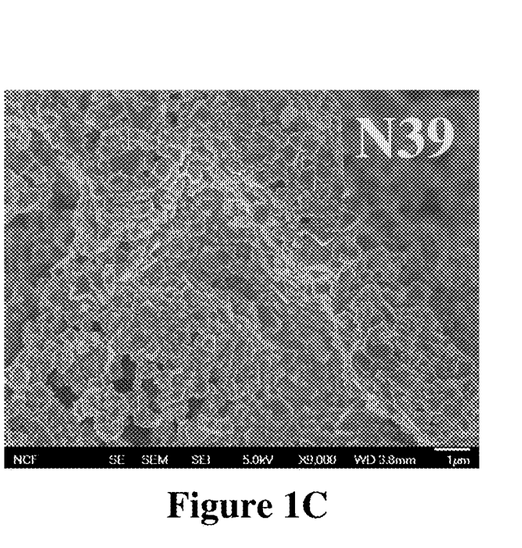
Figure 1D:
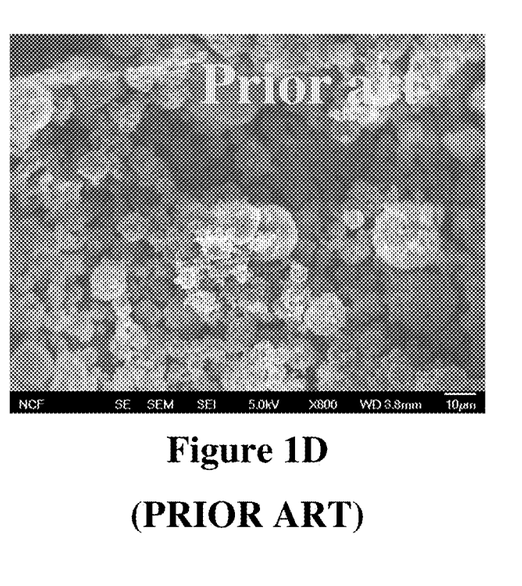
FIG. 1D is a scanning electron microscopy image of a $LiNi_{0.5}Mn_{1.5}O_4$ composition of the prior art.

FIGS. 1A-1C show scanning electron microscopy images of the novel $Li_wNi_xMn_yO_z$ composition and FIG. 1D shows a scanning electron microscopy image $Li_wNi_xMn_yO_z$ material of the prior art. The novel $Li_wNi_xMn_yO_z$ composition can be in the form of particles. The particles can have a shape generally resembling an octahedral or more generally having an octahedral shape. This is in contrast to the $LiNi_{0.5}Mn_{1.5}O_4$ materials of the prior art, which are commonly spherically shaped.

Moreover, the novel $Li_wNi_xMn_yO_z$ composition particles can have a sub-micron to micron meter particle size. Commonly, the novel $Li_wNi_xMn_yO_z$ composition particles have an average particle size from about 10 nm to about 3 μm, more commonly an average particle size of about 200 nm. Typically, the average particle size can be from about 25 to about 1000 nm, more typically from about 50 to about 500 nm, or even more typically from about 100 to about 300 nm. The average particle size can refer to one of $P_{80}$, $P_{85}$, $P_{90}$ or $P_{95}$ particles size typically from about 10 nm to about 3 μm, more typically about 200 nm. Commonly, the average particle size can be from about 25 to about 1000 nm, more commonly from about 50 to about 500 nm, or even more commonly from about 100 to about 300 nm. This is in contrast to the $LiNi_{0.5}Mn_{1.5}O_4$ materials of the prior art, which typically have a particle size of about 10 μm.

Figure 2:
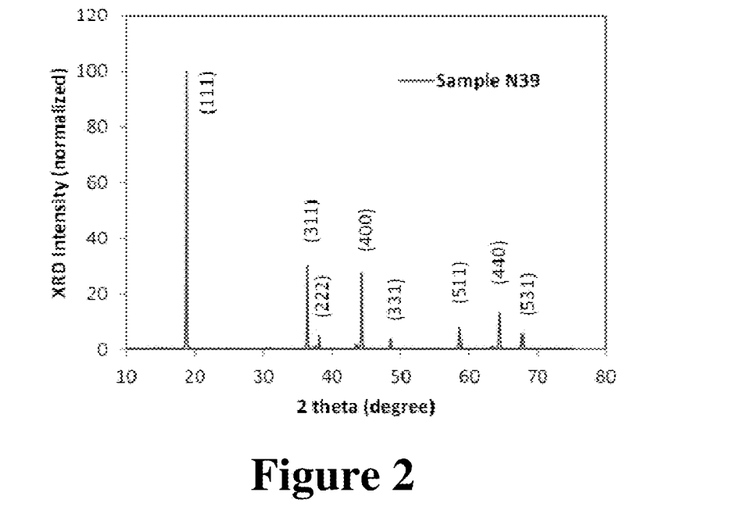
FIG. 2 shows an X-ray diffraction pattern of novel $Li_wNi_xMn_yO_z$ compositions according to embodiments of the present disclosure.

FIG. 2 shows an X-ray diffraction pattern of the novel $Li_wNi_xMn_yO_z$ composition (sample N39, see below). The X-ray diffraction pattern of the novel $Li_wNi_xMn_yO_z$ composition is indicative of a crystalline spinel structure. Table 1 shows novel the $Li_wNi_xMn_yO_z$ compositions prepared by the method described herein. The method general includes varying the balling milling and/or mechanical mixing parameters.

TABLE 1

| Sample | Spinel (wt %) | NiMnO‡ (wt %) | LiNiO* (wt %) | Lattice Parameter (Å) |
|---|---|---|---|---|
| Prior Art | 98.2 | 1.8 | — | 8.1646 |
| N25 | 85.3 | 8.5 | 6.2 | 8.1968 |
| N26 | 94.4 | 5.6 | — | 8.1819 |
| N39 | 97.7 | 2.3 | — | 8.1725 |
| N15 | 99.1 | 0.9 | — | 8.1706 |

‡NiMnO generally refers to $Ni_6MnO_8$
*LiNiO generally refers to $(Li_{0.69}Ni_{0.01})(NiO_2)$
wt % of NiMnO and LiNiO were calculated using the Reference Intensity Ratio method The wt % crystalline spinel was determined by x-ray diffraction with the best fit of the data to ICDD (the international center for diffraction data). The primary crystalline phase was determined to be face centered cubic. The face centered cubic structure was determined to belong to the space group Fd3m. Since the space group Fd3m has cubic symmetry, lattice parameter "a" refers to a lattice constant along either x or y or z direction, and is the measure of the size of the unit cell in the lattice.

The $LiNi_{0.5}Mn_{1.5}O_4$ material of the prior art was purchased from Aldrich and was reported to be prepared according to N. Marandian Hagh and G. G. Amatucci, ECS Transactions, 11 (29) 21-26 (2008), incorporated in its entirety herein by this reference. The preparation method is a modified Pechini method in which the starting materials are dissolved in aqueous solution followed by acid addition, drying and annealing without any ball milling or mechanical grinding.

Figure 3:
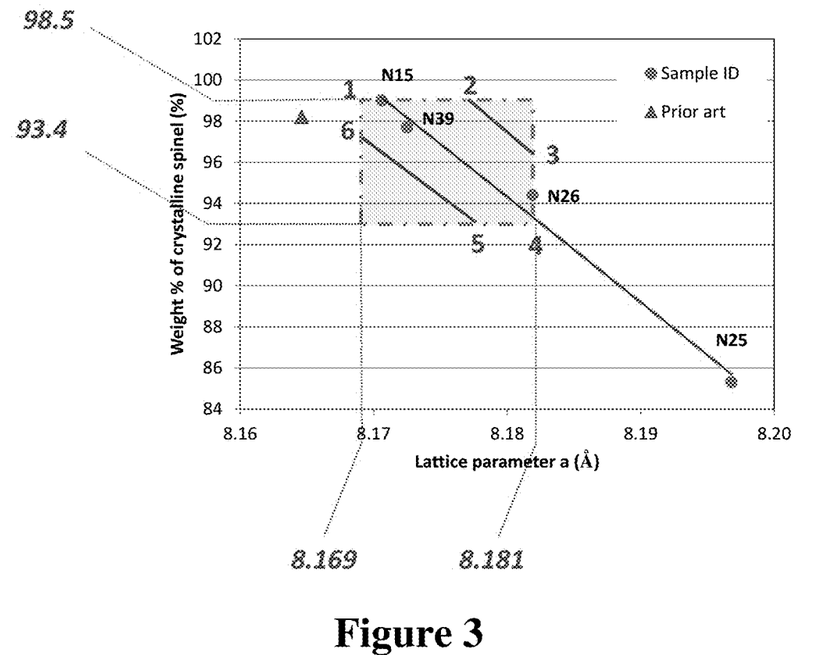
FIG. 3 depicts a relationship between the wt % crystalline spinel and the lattice parameter "a" for novel $Li_wNi_xMn_yO_z$ compositions according to embodiments of the present disclosure.

FIG. 3 shows a relationship between the wt % crystalline spinel and the lattice parameter "a" for the novel $Li_wNi_xMn_yO_z$ composition. Prior art $Li_wNi_xMn_yO_z$ materials having a similar wt % crystalline spinel phase commonly have a smaller lattice parameter "a" than the novel $Li_wNi_xMn_yO_z$ compositions. It is believed that the smaller lattice parameter "a" of the prior art $LiNi_{0.5}Mn_{1.5}O_4$ materials corresponds to a more ordered spinel. Accordingly, the novel $Li_wNi_xMn_yO_z$ compositions generally have the smaller lattice parameter "a" are believed to have a disordered crystalline spinel than the $LiNi_{0.5}Mn_{1.5}O_4$ materials of the prior art. Furthermore, the novel $Li_wNi_xMn_yO_z$ compositions typically have a greater wt % crystalline spinel than the $Li_wNi_xMn_yO_z$ materials of the prior art. Moreover, it is believed that the NiMnO (generally believed to be $Ni_6MnO_8$) and the LiNiO (generally believe to be $(Li_{0.69}Ni_{0.01})(NiO_2)$) can also be crystalline materials.

Figure 10:
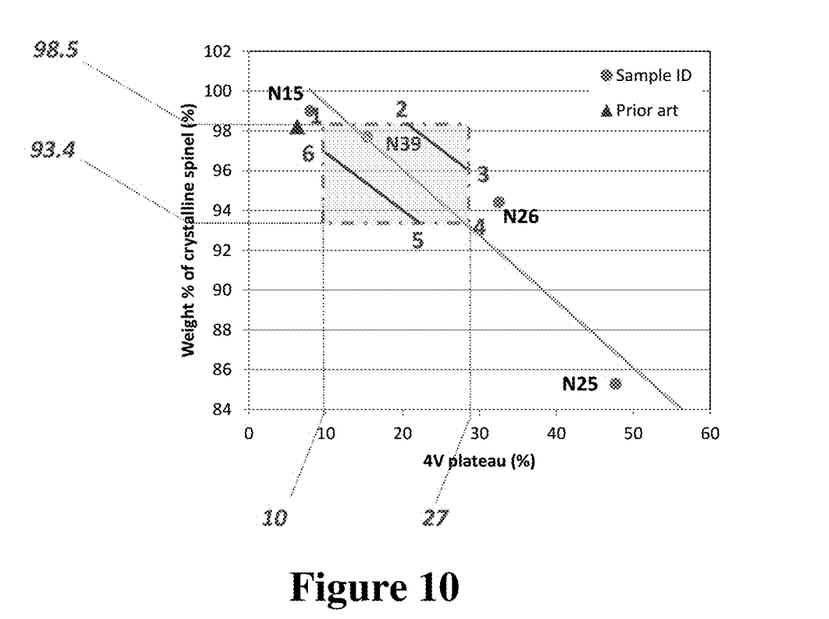
FIG. 10 depicts—a relationship between the wt % crystalline spinel and the percent 4 V plateau for novel $Li_wNi_xMn_yO_z$ compositions according to embodiments of the present disclosure.

FIG. 10 shows a relationship between the wt % crystalline spinel and the 4 V plateau for the novel $Li_wNi_xMn_yO_z$ composition. While not wanting to be bound by any theory, the prior art $LiNi_{0.5}Mn_{1.5}O_4$ materials are believed to have a spinel contain $Ni^{2+}$ and $Mn^{4+}$ in a more ordered crystalline structure than the novel $Li_wNi_xMn_yO_z$ compositions. Furthermore, it is believed that one or both of the smaller lattice parameter "a" and the wt % crystalline spinel can be related to presence and/or amount of $Mn^{3+}$ in the novel $Li_wNi_xMn_yO_z$ compositions can affect the 4 V plateau. Moreover, it is believed that one or both of the smaller lattice parameter "a" and the wt % crystalline spinel can be related to presence and/or amount of $Mn^{3+}$ in the crystalline spinel of the novel $Li_wNi_xMn_yO_z$ compositions.

Moreover, it is believed that regular arrangement of $Ni^{2+}$ and $Mn^{4+}$ ions in the spinel can contribute to the wt % crystalline spinel of in the novel $Li_wNi_xMn_yO_z$ composition. It is further believed that the wt % crystalline spinel of in the novel $Li_wNi_xMn_yO_z$ composition decreases when Ni and Mn ions are randomly distributed in the 16d sites of the face centered cubic structure.

Typically, the novel $Li_wNi_xMn_yO_z$ compositions having one or more of high capacity, high energy density, high rate capability and long cycle life typically have one or more of a lattice parameter "a" from about 8.169 to about 8.181 Å, a 4.0 V plateau from about 10% to about 27%, and a spinel crystalline phase from about 93.4 to about 98.5% (derived from XRD analysis). The 4.0 V plateau is defined as specific capacity at 4.0 V (between 3.8 V and 4.3 V) vs. total specific capacity in percent (between 3.00 V and 4.95 V), when cycled at low rate e.g. 0.25 C rate of LNMO/Li half cells. Furthermore, the novel $Li_wNi_xMn_yO_z$ compositions having one or more of a high temperature cycling stability applications typically have one or more of a lattice parameter "a" from about 8.175 to 8.200 Å, a 4.0 V plateau from about 17% to 54%, and a spinel crystalline phase from about 85 to about 96%.

Commonly, the novel $Li_wNi_xMn_yO_z$ composition can have a lattice parameter "a" from about 8.175 to about 8.200 Å and a 4.0 V plateau from about 10% to about 27%, more commonly a lattice parameter "a" from about 8.169 to about 8.181 Å and a 4.0 V plateau from about 10% to about 27%.

Typically, the novel $Li_wNi_xMn_yO_z$ composition can have a lattice parameter "a" from about 8.169 to about 8.181 Å and a 4.0 V plateau from about 17 to about 54%, more typically a lattice parameter "a" from about 8.169 to about 8.181 Å and a 4.0 V plateau from about 15 to about 40%, even more typically a lattice parameter "a" from about 8.169 to about 8.181 Å and a 4.0 V plateau from about 13 to about 35%, or even more typically a lattice parameter "a" from about 8.169 to about 8.181 Å and a 4.0 V plateau from about 10 to about 27%.

Generally, the novel $Li_wNi_xMn_yO_z$ composition can have a lattice parameter "a" from about 8.175 to about 8.200 Å and a spinel crystalline phase from about 85 to about 96%, more generally, a lattice parameter "a" from about 8.175 to about 8.200 Å and a spinel crystalline phase from about 90 to about 97%, or even more generally a lattice parameter "a" from about 8.175 to about 8.200 Å and a spinel crystalline phase from about 93.4 to about 98.5%.

Commonly, the novel $Li_wNi_xMn_yO_z$ composition can have a lattice parameter "a" from about 8.169 to about 8.181 Å and a spinel crystalline phase from about 85 to about 96%, more commonly, a lattice parameter "a" from about 8.169 to about 8.181 Å and a spinel crystalline phase from about 90 to about 97%, or even more commonly a lattice parameter "a" from about 8.169 to about 8.181 Å and a spinel crystalline phase from about 93.4 to about 98.5%.

Figure 4:
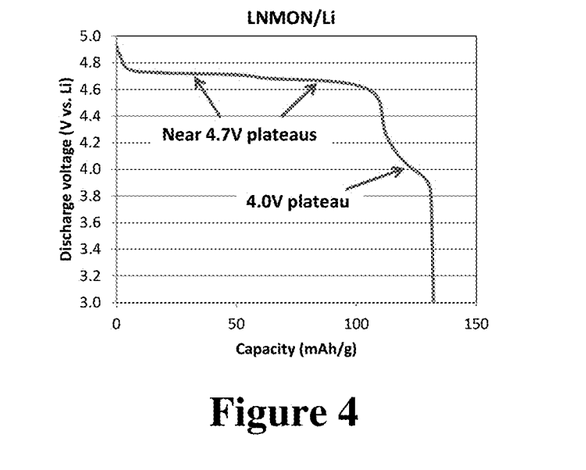
FIG. 4 depicts a discharge voltage profile for a novel $Li_wNi_xMn_yO_z$ composition according to embodiments of the present disclosure.
Figure 5:
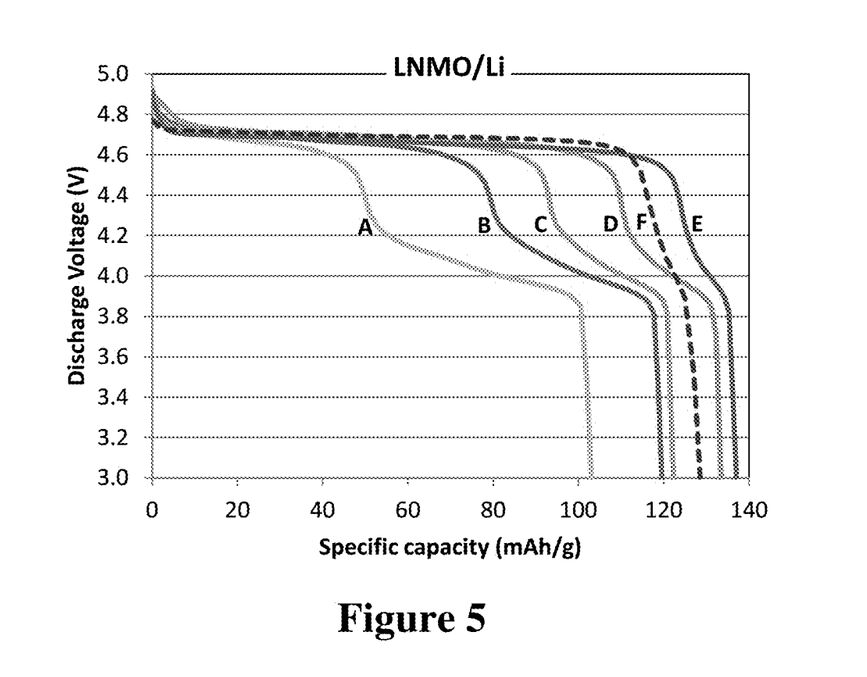
FIG. 5 depicts the voltage profiles of $Li_wNi_xMn_yO_z$ compositions with varying voltage plateaus according to embodiments of the present disclosure.
Figure 6:
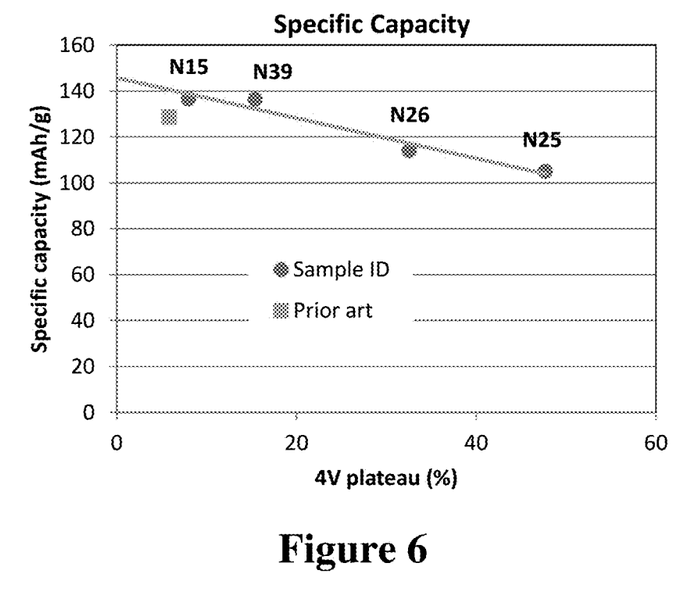
FIG. 6 depicts the specific capacity of $Li_wNi_xMn_yO_z$ compositions with varying voltage plateaus according to embodiments of the present disclosure.
Figure 7:
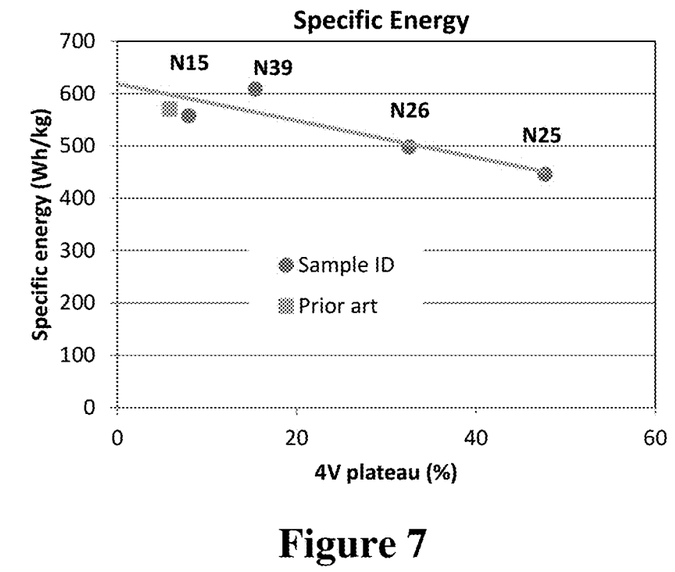
FIG. 7 depicts the specific energy of $Li_wNi_xMn_yO_z$ compositions with varying voltage plateaus according to embodiments of the present disclosure.
Figure 8:
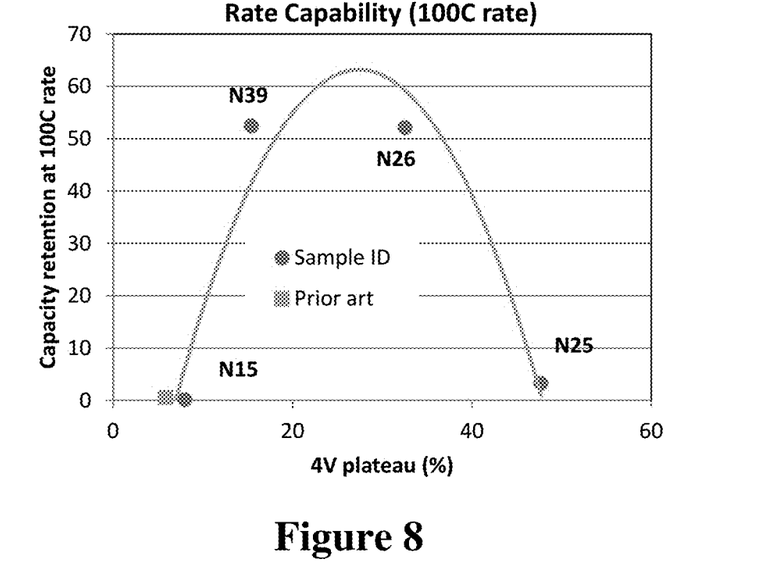
FIG. 8 depicts the rate capability of $Li_wNi_xMn_yO_z$ compositions with varying voltage plateaus according to embodiments of the present disclosure.
Figure 9:
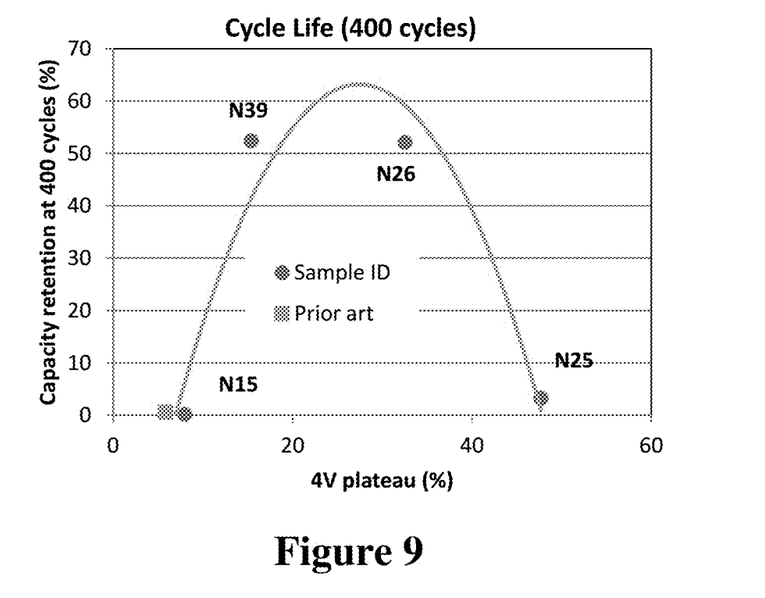
FIG. 9 depicts the cycle life of $Li_wNi_xMn_yO_z$ compositions with varying voltage plateaus according to embodiments of the present disclosure.

FIG. 4 shows a discharge voltage profile for a coin half-cell containing the novel $Li_wNi_xMn_yO_z$ composition (sample N39) against a lithium metal anode. There are two major voltage plateaus. One of the major voltage plateaus is at about 4.7 V due to $Ni^{4+}/Ni^{3+}$ and $Ni^{3±}/Ni^{2+}$ redox couples and another major plateau is at about 4.0 V due to $Mn^{4+}/Mn^{3+}$ redox couple. Varying ball milling and/or mechanical mixing parameters led to novel $Li_wNi_xMn_yO_z$ composition with different 4.0 V and 4.7 V voltage plateau proportions as depicted in FIG. 5, where line labeled "A" is N25, where line labeled "B" is N26, where line labeled "C" is N17, where line labeled "D" is N39, where line labeled "E" is N15, and where line labeled "F" is prior art.

Electrochemical performance of the novel $Li_wNi_xMn_yO_z$ compositions as a function of 4 V plateau are plotted in FIGS. 6-9, where 4.0 V plateau is defined as specific capacity at 4.0 V (between 3.8 V and 4.3 V) vs. total specific capacity in percent, the 100 C rate is defined as discharge capacity at 100 C rare vs. that at 0.25 C rate in percent. Cycle life is typically defined as discharge capacity at the 400th cycle vs. that of 1st cycle in percent.

Figure 11:
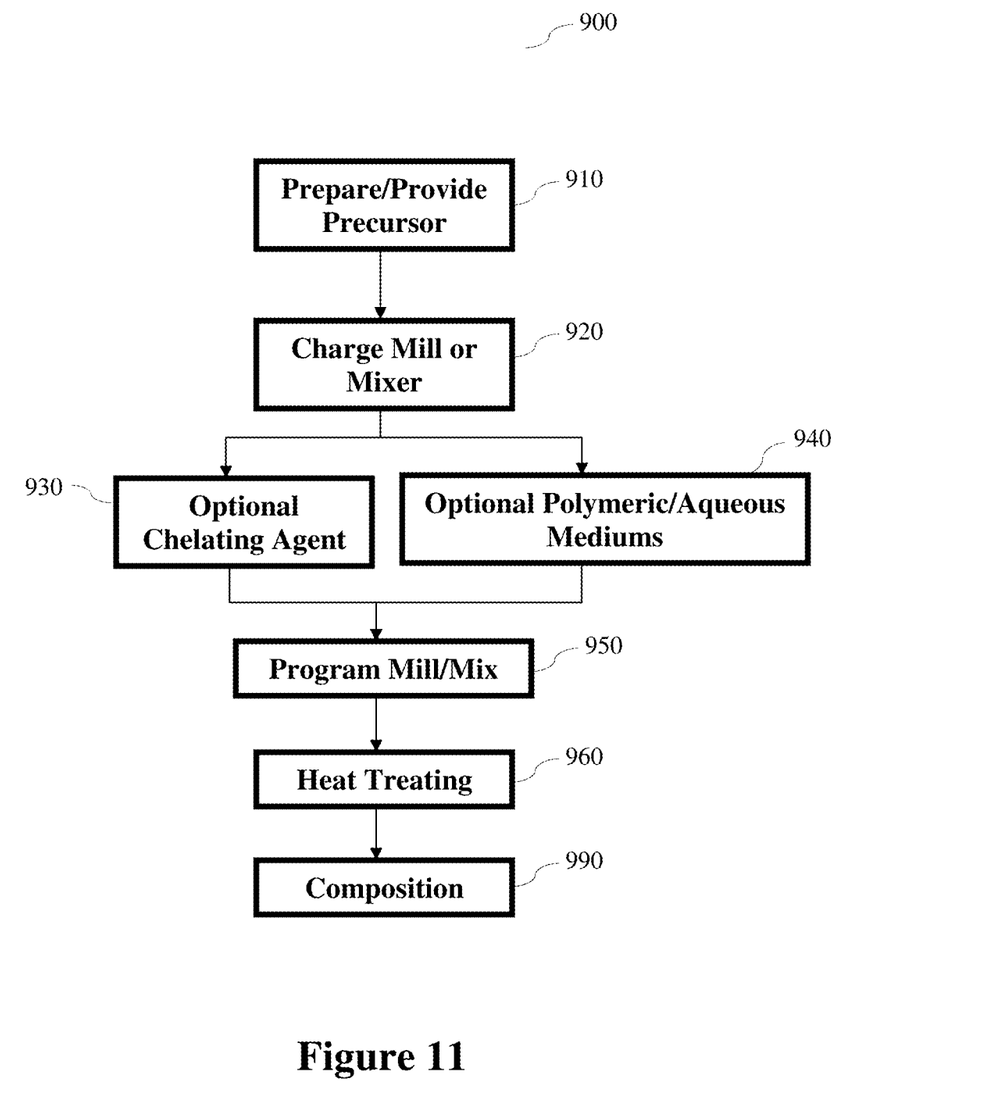
FIG. 11 depicts a process for making novel $Li_wNi_xMn_yO_z$ compositions according to embodiments of the present disclosure.
Figure 12:
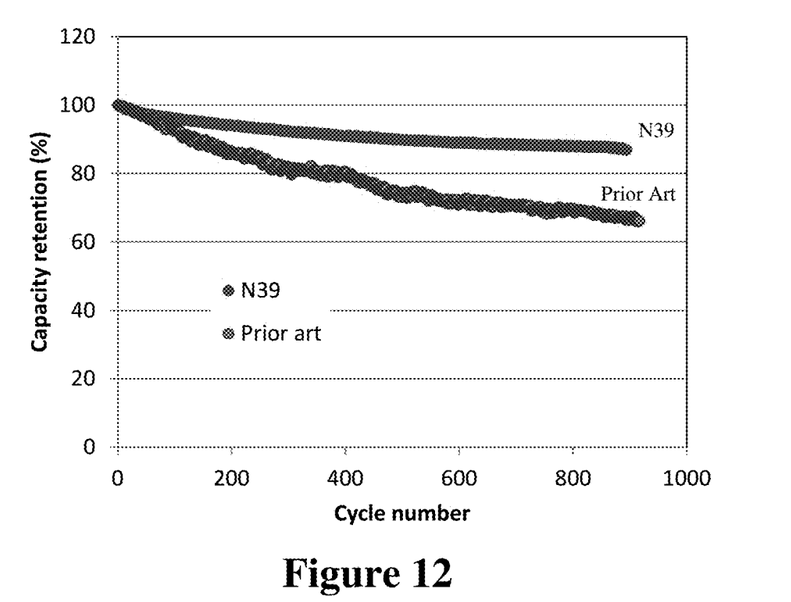
FIG. 12 depicts coin half-cell room temperature cycle life test for the novel $Li_wNi_xMn_yO_z$ compositions according to embodiments of the present disclosure.
Figure 13:
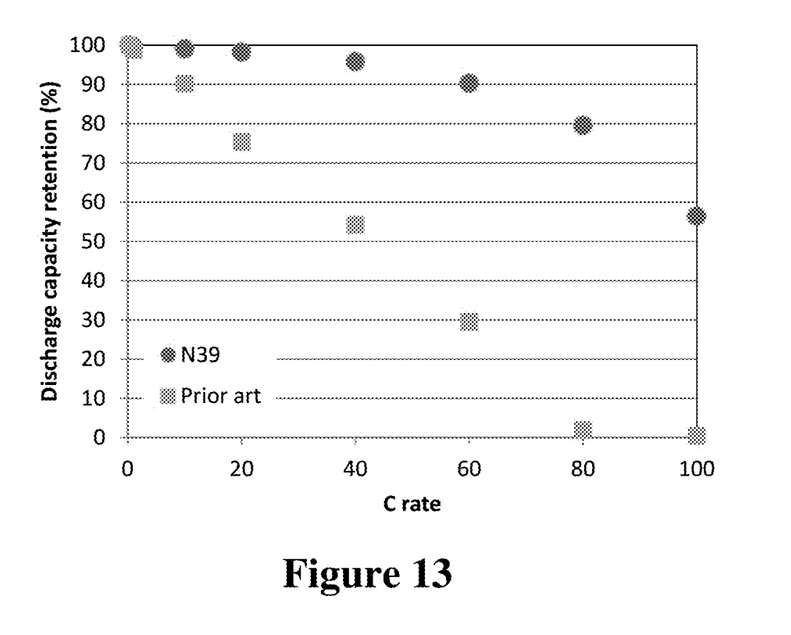
FIG. 13 depicts coin half-cell room rate capability test for the novel $Li_wNi_xMn_yO_z$ compositions according to embodiments of the present disclosure.

The novel $Li_wNi_xMn_yO_z$ compositions cover a wide range of performance properties that can be used to design products to suit specific application needs. According to the process, ball milling and/or mechanical mixing parameters can be adjusted to produce the novel $Li_wNi_xMn_yO_z$ compositions not only with high specific capacity and high specific energy but also with high rate capability and long cycle life, the latter two attributes are much better than the prior art $LiNi_{0.5}Mn_{1.5}O_4$ material, as can be seen from FIGS. 8 and 9. Superior electrochemical performance of the novel $Li_wNi_xMn_yO_z$ compositions compared with the prior art $LiNi_{0.5}Mn_{1.5}O_4$ material is further demonstrated in FIG. 12 for room temperature cycle life and in FIG. 13 for relative rate capability where the cells were discharged consecutively to 3 V cutoff voltage from high to low rates, with 30 min rest between rates In accordance with some embodiments is a process 900 of making novel $Li_wNi_xMn_yO_z$ composition 990 (FIG. 11).

In step 910, a precursor mixture is one or more of prepared or provided. The precursor mixture generally comprises a lithium compound, a nickel compound and a manganese compound. The lithium compound can be one or more of lithium acetate dihydrate, lithium oxide, lithium hydroxide, and lithium acetate. The nickel compound can be one or more of nickel acetate tetrahydrate, nickel acetate, nickel oxide, nickel nitrate and nickel sulfate. The manganese compound can be manganese acetate tetrahydrate, manganese acetate, manganese oxide, manganese nitrate and manganese sulfate. Generally, the precursor mixture comprises a mixture of the lithium, nickel and manganese compounds having a mole ratio of lithium to nickel to manganese of about 2 to about 1 to about 3.

In step 920, the precursor mixture is charged to a ball mill and/or mechanical mixer.

In optional step 930, a chelating agent is charged to the ball mill and/or mechanical mixer. Typically, the chelating agent comprises oxalic acid. More typically, the chelating agent can comprise phosphoric acid ($H_3PO_4$), carbonic acid ($H_2CO_3$), citric acid ($H_3C_6H_5O_7$), acetic acid ($HC_2H_3O_2$), nitric acid ($HNO_3$), and sulfuric acid ($H_2SO_4$). In some embodiments, the chelating agent can be ammonium hydroxide ($NH_4OH$).

In optional step 940, a polymeric and/or aqueous medium is charged to the ball mill and/or mechanical mixer. The polymeric agent can comprise polyethylene glycol (PEG). Typically, the polymeric agent can comprise one or of polyvinylpyrrolidone (PVP), polymethyl methacrylate (PMMA), and polyethylene glycol (PEG). The aqueous medium typically comprises deionize water. In some embodiments, the aqueous medium can comprise a mixture of deionized water and an alcohol. The alcohol can comprise one of ethanol, isopropanol and a mixture of ethanol and isopropanol. Generally, the mixture of deionized water and alcohol comprises from about 50 to about 100 volume % water. Moreover, the polymeric and/or aqueous medium can comprise a mixture of the polymeric agent and the aqueous medium. In some embodiments, the mixture of the polymeric agent and the aqueous medium can form about 0 to about 50 volume % deionized water.

The process 900 includes without limitation programmed mechanical ball milling and/or programmed mechanical mixing 950 of a precursor mixture 910.

While not wanting to be limited by theory, the chelating agents are believed to assist molecular level mixing of the precursors to obtain the novel $Li_wNi_xMn_yO_z$ compositions having one or more of a desired stoichiometry, morphology, and particle size. Similarly, it is believed that one or both of the polymeric and aqueous mediums assist molecular level mixing of precursors obtain the novel $Li_wNi_xMn_yO_z$ compositions having one or more of a desired stoichiometry, morphology, and a desired particle size. It can be appreciated that the novel $Li_wNi_xMn_yO_z$ compositions typically have a nano-scale particle size. Commonly, the novel $Li_wNi_xMn_yO_z$ composition particles have an average particle size from about 10 nm to about 3 um, more commonly an average particle size of about 200 nm. The average particle size can refer to one of $P_{80}$, $P_{85}$, $P_{90}$ or $P_{95}$ particles size typically from about 10 nm to about 3 um, more typically about 200 nm. This is in contrast to the $Li_wNi_xMn_yO_z$ materials of the prior art which commonly have a spherically shape particle morphology and a particle size of about 10 μm.

While not wanting to be limited by example, it is believed that precursor mixing alone or in combination with one or both of the level of the chelating agent(s) and the level of the polymeric and/or aqueous mediums can assist in obtaining the novel $Li_wNi_xMn_yO_z$ composition having one or more of a desired stoichiometry, morphology, and obtain the novel $Li_wNi_xMn_yO_z$ composition having one or more of a desired particle size. The mixing can be by one or more of mechanical mixing and ball milling. It is further believed that adding the polymeric and/or aqueous mediums to the one or more of ball milling or mechanical mixing allows for one or more of a more precise dynamic impact control and intimate precursor mixing. Moreover, adding the chelating agents can further improve precursor mixing by achieving molecular level mixing before the multiple-stage heat treatment. The ball milling container and milling balls are generally corrosion resistant and chemically resistant to materials to be milled, such as the precursor, chelating agents and polymeric and/or aqueous mediums. Furthermore, the ball milling container is typically made of any high density plastic or stainless steel or hardened steel, that is, the ball milling container is typically mechanically impact durable. Mechanical mixing methods can include one or more of roller, propeller, and mortar grinder mixing. It can be appreciated that the milling and/or mixing can be automated, manual or a combination thereof.

In step 950, the precursor mixture with or without one or more of the chelating agent and the polymeric and/or aqueous medium are subjected to a multiple-step ball milling or mechanical mixing process. The multiple-step ball milling or mechanical mixing process typically includes one or more milling and/or mixing speeds (rpm), one or more milling and/or mixing times, one or more pause periods between each of one or more milling and/or mixing segments, and one or ore rotation reversals after each of the one or more milling and/or mixing segments.

The ball milling and/or mechanical mixing process can include one or more of ball-to-precursor volume ratio, liquid-to-solid volume or weight ratio, precursor-to-container volume ratio, and chelating and/or aqueous agent-to-precursor volume or weight ratio. Typically, the ball-to-precursor volume ratio is typically from about 0.10 to about 0.30, more typically from about 0.20 to about 0.25. Commonly the precursor-to-container volume ratio is from about 0.05 to about 0.25, more commonly about 0.2. Generally, the chelating agent-to-precursor weight ratio is from about 0.3 to about 0.5, more generally about 0.4. The polymeric medium-to-precursor weight ratio is typically from about 0.3 to about 0.5, more typically about 0.4. Commonly, the water-to-polymeric medium weight ratio is from about 0.0 to about 2.0, more commonly about 1.0. Typically, the polymeric and/or aqueous medium-to-precursor weight ratio is from about 0.3 to about 1.5, more typically about 1.0. The ball milling balls can be stainless balls. The stainless steel balls generally have a diameter from about 0.5 to about 2.0 cm, more generally of about 1 cm.

The ball milling and/or mechanical mixing step 950 can comprise: mixing the precursor to form a mixed precursor; adding the chelating agents (step 930) to the mixed precursor and thereafter mixing the chelating agents with the mixed precursor to form a chelated mixture; and, adding the polymeric and/or aqueous mediums (step 940) to the chelated mixture and thereafter mixing to form a medium mixture.

Typically, the precursor is ball milled at a speed from about 250 to about 500 rpm, more typically at about 450 rpm. The total ball milling time is generally from about 1.5 to about 7 min, more generally about 3 min. The ball milling can be a segmental milling. Each segments of the segmental ball milling can be for a period of time from about 10 sec to about 4 min. In some configurations, the period of time is about 10 sec. The segmental milling can be with or without speed direction reversal. Generally, the segmental milling includes speed direction reversal between one or more segments.

Typically, ball milling the chelating agents with the mixed precursor is at a speed from about 250 to about 450 rpm, more typically at about 450 rpm. Generally, the total ball milling time is from about 30 to about 120 sec, more generally about 30 sec. Each segments of the segmental ball milling can be for a period of time from about 5 to about 120 sec. In some configurations, the period of time can be about 5 sec. The segmental milling can be with or without speed direction reversal. Generally, the segmental milling includes speed direction reversal between one or more segments.

Ball milling the polymeric and/or aqueous mediums with the chelated mixture can comprise a single step or one or more sub-steps. The single step or one or more of the sub-steps can include one or both of speed direction reversal and pause after segmental milling. The single step and/or first sub-step commonly have a speed from about 100 to about 200 rpm, more commonly about 200 rpm. The total milling time is usually about 48 min. The ball milling can be a segmental milling process. Each of the segmented milling stages can be from about 5 to about 10 sec. A pause time from 0 to about 5 sec, more typically about 5 sec can be between each of the segmented milling stages. It can be appreciated that pause times can and cannot be the same between each of the segmented milling stages. A second sub-step can follow the first sub-step. The second sub-step typically has a milling speed from about 150 to about 250 rpm, more typically about 250 rpm. The total milling time for the second sub-step can be about 13 min. The second sub-step can be a segmental ball milling process having one or more second segmental milling stages. Each of the third segmental milling stages generally have a third segmental milling time from about 5 to about 10 sec. Moreover, a pause time after one or more of the third segmental stages is generally from about 0 to about 5 sec, more generally about 5 sec. A third sub-step can follow the second sub-step. The third sub-step commonly has a milling speed of about 300 rpm. Typically, the total ball milling time for the third sub-step can be from about 2 min to about 12 min, more typically about 12 min. The third sub-step can be a segmental milling process having one or more third segmental milling stages. Each of the third segmental milling stages generally have a third segmental milling time from about 5 sec to about 12 min, more generally about 5 sec. Moreover, a pause time after one or more of the third segmental stages is generally from about 0 to about 5 sec, more generally about 5 sec. A fourth sub-step can follow the third sub-step. The fourth sub-step generally has a milling speed from about 200 to about 350 rpm, more general about 350 rpm. Typically, the total milling time for the fourth sub-step can be from about 4 to about 50 min, more typically about 10 min. The fourth sub-step can be a segmental milling process having one or more fourth segmental milling stages. Each of the fourth segmental milling stages generally have a third segmental milling time from about 5 sec to about 30 min, more generally about 5 sec. Moreover, a pause time after one or more of the fourth segmental stages generally have a fourth segmental milling is generally from about 0 to about 5 sec, more generally about 5 sec.

It can be appreciated that the first, second, third and fourth sub-steps can be carried out in any order. In some embodiments, the first sub-step precedes the second sub-step and the third sub-step follows the second sub-step and precedes the fourth sub-step. In some embodiments, the first sub-step precedes the second sub-step and the fourth sub-step follows the second sub-step and precedes the third sub-step. In some embodiments, the first sub-step precedes the third sub-step and the second sub-step follows the third sub-step and precedes the fourth sub-step. In some embodiments, the first sub-step precedes the third sub-step and the fourth sub-step follows the third sub-step and precedes the second sub-step. In some embodiments, the first sub-step precedes the fourth sub-step and the second sub-step follows the fourth sub-step and precedes the third sub-step. In some embodiments, the first sub-step precedes the fourth sub-step and the third sub-step follows the fourth sub-step and precedes the second sub-step. In some embodiments, the second sub-step precedes the first sub-step and the third sub-step follows the first sub-step and precedes the fourth sub-step. In some embodiments, the second sub-step precedes the first sub-step and the fourth sub-step follows the first sub-step and precedes the third sub-step. In some embodiments, the second sub-step precedes the third sub-step and the first sub-step follows the third sub-step and precedes the fourth sub-step. In some embodiments, the second sub-step precedes the third sub-step and the fourth sub-step follows the third sub-step and precedes the first sub-step. In some embodiments, the second sub-step precedes the fourth sub-step and the third sub-step follows the fourth sub-step and precedes the first sub-step. In some embodiments, the second sub-step precedes the fourth sub-step and the first sub-step follows the fourth sub-step and precedes the third sub-step. In some embodiments, the third sub-step precedes the first sub-step and the second sub-step follows the first sub-step and precedes the fourth sub-step. In some embodiments, the third sub-step precedes the first sub-step and the fourth sub-step follows the first sub-step and precedes the second sub-step. In some embodiments, the third sub-step precedes the second sub-step and the first sub-step follows the second sub-step and precedes the fourth sub-step. In some embodiments, the third sub-step precedes the second sub-step and the fourth sub-step follows the second sub-step and precedes the first sub-step. In some embodiments, the third sub-step precedes the fourth sub-step and the first sub-step follows the fourth sub-step and precedes the second sub-step. In some embodiments, the third sub-step precedes the fourth sub-step and the second sub-step follows the fourth sub-step and precedes the first sub-step. In some embodiments, the fourth sub-step precedes the first sub-step and the second sub-step follows the first sub-step and precedes the third sub-step. In some embodiments, the fourth sub-step precedes the first sub-step and the third sub-step follows the first sub-step and precedes the second sub-step. In some embodiments, the fourth sub-step precedes the second sub-step and the first sub-step follows the second sub-step and precedes the third sub-step. In some embodiments, the fourth sub-step precedes the second sub-step and the third sub-step follows the second sub-step and precedes the first sub-step. In some embodiments, the fourth sub-step precedes the third sub-step and the first sub-step follows the third sub-step and precedes the second sub-step. In some embodiments, the fourth sub-step precedes the third sub-step and the second sub-step follows the third sub-step and precedes the first sub-step.

Typically, the precursor is mechanically mixed. Typically, the precursor is mechanically mixed at a speed from about 50 rpm to about 300 rpm, more typically about 125 rpm. The total mechanical mixing time of the precursor is generally from about 10 sec to about 2 min, more generally about 1 min.

Generally, mechanically mixing the chelating agents with the mixed precursor is at a mechanical mixing speed from about 50 rpm to about 300 rpm, more generally about 125 rpm. The total mechanical mixing time of the chelating agents with the mixed precursor is commonly from about 10 sec to about 2 min, more commonly about 1 min.

Mechanically mixing the polymeric and/or aqueous mediums with the chelated mixture can comprise one or more steps. The first step commonly has a speed from about 50 rpm to about 300 rpm, more commonly about 125 rpm. Typically, the total mechanical mixing time for the first step is from about 5 to about 20 hrs, more typically about 16 hrs.

When the process includes more than one step, a second step follows the first step. The second step typically includes adding additional polymeric and/or aqueous mediums and mechanically mixing at a speed from about 50 rpm to about 300 rpm, more typically about 125 rpm. Commonly, the total mechanical mixing time can be from about 5 to about 20 hrs, more commonly about 16 hrs. The second step may or may not be included in the process, when the second step is in included in the process it can be repeated from 1 to 4 times.

The first step and one or more second steps can be performed in any order. In some embodiments the first step is precedes the second step performed sequentially from 1 to 4 times. In some embodiments, the second step is performed once before the first step and the second step is preformed again from 1 to 3 times after the first step. In some embodiments, second step is performed twice before the first step and the second step is preformed again from 1 to 2 times after the first step. In some embodiments, the second step is preformed three times before the first step and the second step may or may not be preformed again after the first step.

In step 960, a multiple-stage heat treatment includes one or more of a processing pressure and a programmed heating profile which includes one or more heating rates, one or more dwell times and one or more cooling rates. After the ball milling and/or mechanical mixing of the precursor mixture with or with one or more of the chelating agent and polymeric and/or aqueous mediums, the precursor mixture is subjected to the multiple-stage heat treatment. In other words, step 960 is conducted after step 950.

The multiple-stage heat treatment can include a first heat treatment stage generally comprising heating a pressure from atmospheric to about 500 kPa in air or oxygen environment. Generally, the first heat treatment stage comprises heating to a first temperature. Commonly, the first temperature is from about 50 to about 120 degrees Celsius, more commonly about 80 degrees Celsius. Furthermore, the first heat treatment stage is maintained at the first temperature for about 12 to about 24 hrs.

The multiple-stage heat treatment can include a second heat treatment stage. The first heat treatment stage typically precedes the second heat treatment stage. Typically, the second heat treatment stage comprises heating to a second temperature. Generally, the second temperature is from about 400 to about 500 degrees Celsius, more generally about 450 degrees Celsius.

The second heat treatment stage can further include a second stage rate of heating. Typically, the second stage rate of heating can be from about 1 to about 3 degrees Celsius/minute, more generally about 2 degrees Celsius/minute.

Moreover, the second heat treatment stage can further include a second stage dwell time. The second stage dwell time generally refers a period of time of maintaining the temperature at the second temperature. Commonly, the second stage dwell time is from about 200 to about 400 minutes, more commonly about 300 minutes.

The multiple-stage heat treatment can include a third heat treatment stage. The second heat treatment stage typically precedes the third heat treatment stage. Typically, the third heat treatment stage comprises heating to a third temperature. Generally, the third temperature is from about 800 to about 900 degrees Celsius, more generally about 850 degrees Celsius.

Furthermore, the third heat treatment stage can further include a third stage rate of heating. Typically, the third stage rate of heating can be from about 4 to about 8 degrees Celsius/minute, more generally about 6 degrees Celsius/minute.

The third heat treatment stage can further include a third stage dwell time. The third stage dwell time generally refers a period of time of maintaining the temperature at the third temperature. Commonly, the third stage dwell time is from about 800 to about 1,000 minutes, more commonly about 900 minutes.

The multiple-stage heat treatment can include a cooling stage having a rate of cooling. Typically, the rate of cooling is from about 2 to 6 degrees Celsius/minute, more typically about 4 degrees Celsius/minute. The cooling stage can be after one or more of the first, second and third heat treatment stages. Moreover, the cooling can be in lieu or after one or both of the second and third stage dwell times.

The synthesis process, according to this disclosure, combines chelating agents, polymeric and/or aqueous mediums, programmed mechanical ball milling or mixing, and multiple-stage heat treatment to produce final novel $Li_wNi_xMn_yO_z$ products that cover a wide range of material and performance characteristics. A pre-conditioning process, according to this disclosure, includes thermal soaking or cycling at various temperatures for a certain period of time or for a number of cycle numbers, leading to stable high temperature performance of novel $Li_wNi_xMn_yO_z$ composition.

A number of variations and modifications of the disclosure can be used. It would be possible to provide for some features of the disclosure without providing others.

The present disclosure, in various embodiments, configurations, or aspects, includes components, methods, processes, systems and/or apparatus substantially as depicted and described herein, including various embodiments, configurations, aspects, sub-combinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention that the claimed material requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the disclosed description has included description(s) of one or more embodiments, configurations, or aspects and certain variations and modifications, other variations, combinations, and modifications are within the scope of the disclosure e.g., as may be within the skill and knowledge of those in the art, after understanding of the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A composition, comprising: lithium, nickel, manganese and oxygen and having a lattice parameter from 8.169 to 8.181 Angstroms; a wt % crystalline $LiNi_{0.5}Mn_{1.5}O_4$ spinel value from 94.4 to 97.7%; a wt % $Ni_6MnO_8$ from 2.3 to 5.6%, wherein a X-ray intensity ratio analysis of the composition does not detect any $(Li_{0.69}Ni_{0.01})(NiO_2)$.

2. The composition of claim 1, further having a % 4 V plateau determined at a specific capacity between about 3.8 and about 4.3 V versus the total specific capacity.

3. The composition of claim 1, wherein the composition has an average particle size from about 10 nm to about 3 μm.

4. The composition of claim 1, wherein the composition comprises particles resembling an octahedral.

5. The composition of claim 2, wherein the composition has a % 4 V plateau from about 10 to about 27% and determined at a specific capacity between about 3.8 and about 4.3 V versus the total specific capacity.

6. A composition, comprising lithium, nickel, manganese and oxygen and having a % 4 V plateau value from 10% to 27% determined at a specific capacity between about 3.8 and about 4.3 V versus the total specific capacity between 3.00 V and 4.95 V when cycled at a rate of 0.25 C., a wt % crystalline $LiNi_{0.5}Mn_{1.5}O_4$ spinel from 94.4 to 97.7%; a wt % $Ni_6MnO_8$ from 2.3 to 5.6%, and wherein X-ray intensity analysis of the composition does not detect any $(Li_{0.69}Ni_{0.01})(NiO_2)$.

7. The composition of claim 6, wherein the composition comprises particles, wherein the particles resemble an octahedral and wherein the particles have an average particle size from about 10 nm to about 3 μm.

8. A composition comprising: lithium, nickel, manganese and oxygen and having a lattice parameter "a" value from 8.169 to 8.181 Å, a wt % crystalline $LiNi_{0.5}Mn_{1.5}O_4$ spinel from 94.4 to 97.7%; a wt % $Ni_6MnO_8$ from 2.3 to 5.6%, and wherein X-ray intensity analysis of the composition fails to detect any $(Li_{0.69}Ni_{0.01})(NiO_2)$, make by a process having the steps of:

milling a precursor mixture having a molar ratio of lithium:nickel:manganese of about 2 to about 1 to about 3 to form a milled precursor;

adding a chelating agent to the milled precursor to form a chelated mixture and thereafter milling with at least one reversal of the milling direction the chelated mixture to form a milled chelated mixture; and adding a polymeric, aqueous medium to the milled chelated mixture to form a polymeric mixture and, thereafter milling with more than two reversals of the milling direction the polymeric mixture to form the composition.

9. The composition of claim 8, further having a % 4 V plateau from about 10 to about 27% determined at a specific capacity between about 3.8 and about 4.3 V versus the total specific capacity, wherein the milling with at least one reversal comprises a pause of no more than 1 second between each of the least one reversal of directions.

10. The composition of claim 8, wherein the milling with more than two reversals of the milling direction comprises a pause of more than 1 second between each of the more than two reversal of directions.

11. The composition of claim 10, wherein the milling with more than two reversals of the milling direction further comprises two or more sub-milling steps.

12. The composition of claim 11, wherein each of the two or more sub-milling steps comprise a reversal of the sub-step milling direction and wherein each of the reversal of the sub-step milling direction comprise a pause of less than 1 second.

13. The composition of claim 12, wherein the milling with more than two reversals of the milling direction further comprises four sub-milling steps.

14. The composition of claim 8, wherein the composition is heat treated and wherein the heat treating comprises a multi-stage heating process.

* * * * *